United States Patent Office 3,434,598
Patented Mar. 25, 1969

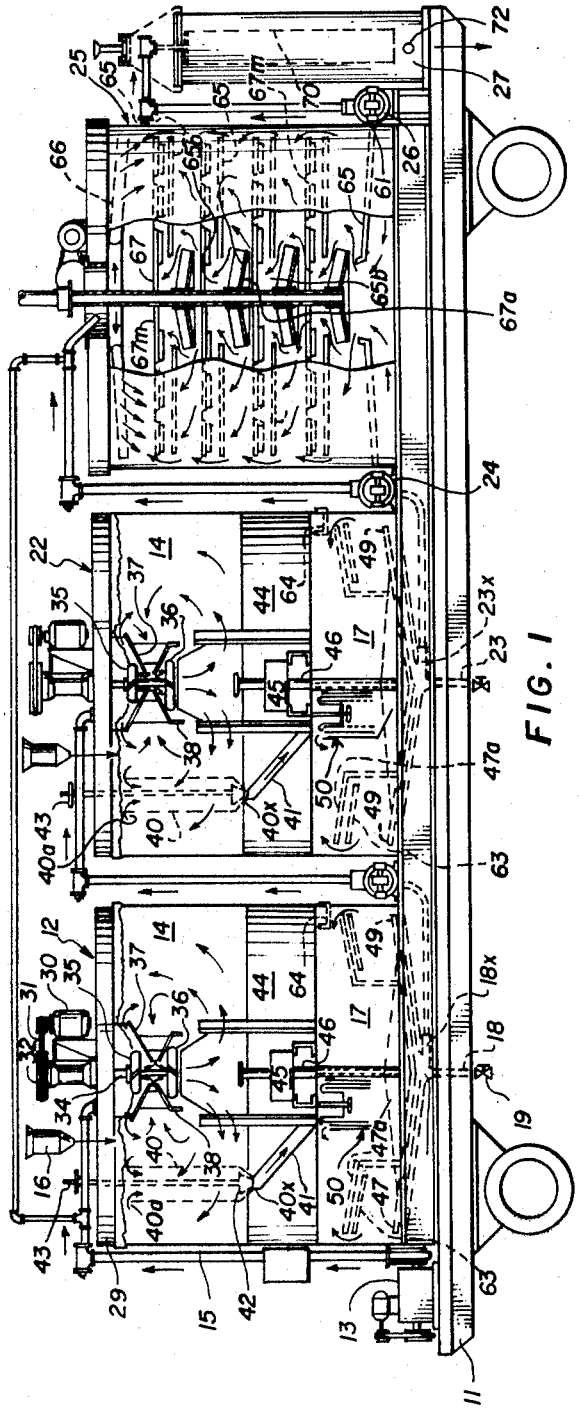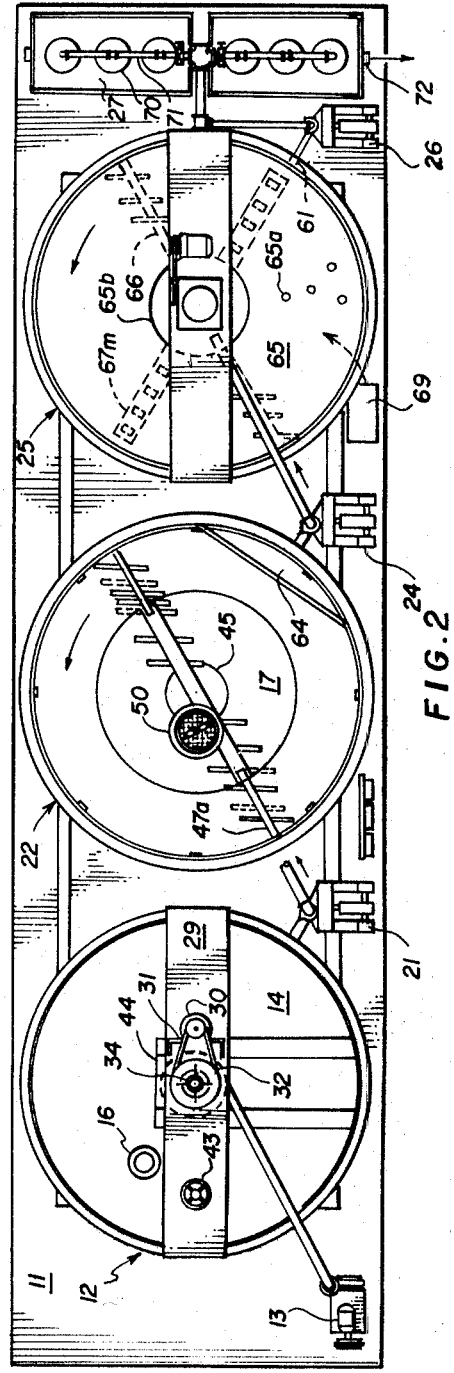

3,434,598
APPARATUS FOR TREATING SEWAGE OR INDUSTRIAL WASTE LIQUIDS
Arthur C. Daman, Denver, Colo., assignor to Dejo, Inc., Denver, Colo., a corporation of Colorado
Filed Apr. 16, 1968, Ser. No. 721,795
Int. Cl. B01d 25/02, 25/00; C02b 1/00
U.S. Cl. 210—199          11 Claims

ABSTRACT OF THE DISCLOSURE

Apparatus for treating sewage or industrial waste liquids for clarification or product recovery. Equipment components mounted on rigid framework transportable as unit to operating site and functioning as base structure during operation. Equipment includes novel combined clarifier or agitator-thickener units with final overflow of thickener directed as feed to novel final clarification stage with discharge therefrom in condition for return to natural or domestic water supply. When separated solids comprise valuable material they are recovered as product of treatment.

---

This invention relates to a complete assembly of apparatus mounted on a portable framework and operable on said framework for treating sewage, industrial waste liquids and similar waste liquids requiring clarification, agitation or conditioning of contained solids for product recovery. A novel method of treatng such liquids also is included in the inventive concept of my invention.

Water pollution has become such a problem in safeguarding public health that municipalities, states and the federal government are legislating control measures directed particularly to the requirements of returning clarified waters of sewage treatments and treatments of industrial wastes, such as wastes of food processing, product manufacturing, mining and milling operations and the like to streams, lakes and other sources of domestic supply.

If such wastes are treated by practices heretofore recognized as providing acceptable standards for municipalities or industry, the cost of establishing plants of adequate capacity and the expense of operating such plants frequently puts a prohibitive cost on the operation involved. Consequently, more efficient and less costly proctices will be required by many plants, municipalities, mines, etc. to comply with the laws or regulations involving pollution controls in the returns of water to water courses and the like, or to determine the best method of treatment.

My invention recognizes the need for providing an efficient and inexpensive plant installation suited for continuous operation at low cost or as a pilot plant to determine the best method of treatment. A suitable wheel-supported base framework is provided on which all plant equipment minus some superstructure is permanently mounted as a unit and this unitary assembly can be transported from one working location to another and is easily set in place for continuous operation at any selected site.

Accordingly, it is an object of my invention to provide a simple, economical and efficient method of treating sewage and industrial wastes which provides a high degree of clarification and purification of the water content of the material taken for treatment and which may be operated selectively for separation and recovery of valuable constituents in its water content.

Another object of my invention is to provide a clarifier and conditioner formed as a combined agitator-thickener unit in a common tank utilizing direct communication between the upper agitator portion and the lower thickener stage with selective feeding of treated solution from the agitator into a novel separator providing controlled feed introduction into the thickener portion and with selective discharge of thickened material from the thickener stage.

A further object of the invention is to provide a novel type of agitator mechanism in liquid clarification apparatus which utilizes a hollow shaft permitting selective introduction of atmospheric air, liquid, other gas or reagents which may be required in the agitative treatment of the material under treatment.

Still another object of the invention is to provide a novel type of combined agitator-thickener mechanism in which the agitator portion is in direct communication with the thickener portion but which utilizes a selective flow control procedure to regulate the input of the solids content of the material introduced into the thickener portion.

Other objects reside in novel details of construction and novel combinations and arrangements of parts, all of which will be set forth fully in the course of the following description.

The accompanying drawings illustrate apparatus particularly adapted to perform the novel treatments of the present invention. In the drawings, in the several views of which like parts bear similar reference numerals;

FIG. 1 is a side elevation of a portable treatment assembly with portions of the equipment broken to show the arrangement of interior parts;

FIG. 2 is a top plan view of the assembly shown in FIG. 1;

Figure 3:
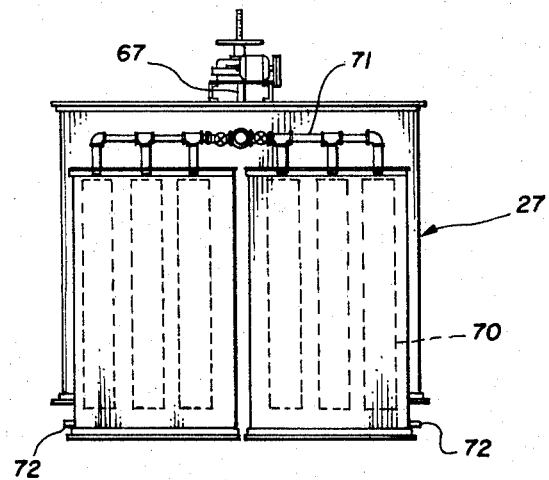
FIG. 3 is an end elevation of the filter stage shown in FIG. 1.

As shown in FIG. 1, the assembly comprises a wheel supported frame or base 11 adapted to be towed by connection to a self-propelled vehicle, such as a tractor or the like, or when the assembly is to be transported for longer distances, the assembly may be mounted on a trailer of a truck-trailer combination of the type utilized in transporting heavy equipment. As shown in FIG. 1, the first combination agitator and thickener unit 12 is mounted adjacent one end of the frame 11 and has a motor and pump unit 13 located adjacent an end wall of same for pumping feed into the top of the agitator portion 14 of tank 15, a portion of which feed may be recycled material from another stage of the treatment. Another feed inlet 16 is provided for directing reagent into the top of agitator portion 14. While not shown, it will be understood that feed inlet 16 will be supported from superstructure (not shown) at the top of first agitator tank 15 and will be connected to a suitable source of supply (not shown).

The lower thickener unit 17 of tank 15 has a drain discharge 18 extending through base 11 and controlled by a valve 19 while another portion 18x of the thickener underflow discharge structure directs the underflow discharge to a pump 21 which elevates the material as feed to a second stage tank 22 which is a combined agitator-thickener unit. This unit has bottom discharges 23 and 23x for its thickener portion similar to those hereinbefore described and a pump 24 conducts the underflow discharge through outlet 23x as the feed to a classifying super clarifier 25 with the clarified liquid from such unit being delivered by a pump 26 into a final filtration stage 27.

The base member 11 shown in FIGS. 1 and 2 is a rigid structure adapted to carrying the weight of the structural components mounted on its upper surface when operating with the respective tanks substantially full of mixed solids and liquids, as would be the usual condition in continuous operation of the plant. The equipment components located on frame or base 11 are permanently secured thereon at the factory and the unitary assembly is adapted for transport from the manufacturing plant to the use site by any convenient means of transportation, such as flat bed railway cars or various trucking arrangements previously described. The wheel support of the frame is required only in such transport operations or short distance transport of the assembly between one operating location and another. Preferably, the wheel assemblies are easily installed and demounted and when not being used in transport operations, they are removed from the base.

When the assembly is intended for operation on a more or less permanent basis at an operating site, it will be preferable to provide concrete footings or other support structure on which the base may be seated and anchored. Also if desired, such foundation structure may comprise concrete or metallic flooring permitting greater convenience in moving about the equipment mounted on the frame and where desired, the installed assembly may be given weather protection as by enclosing it within a building erected after it is in place. However, for certain uses, the owner may require location at one operating site for a given period of time and operation at a second site for another period of time. Under such conditions, the movement of the assembly from the first site to the second site is accomplished as easily as the initial delivery to the first site and once the assembly is in place at any given location, it only requires piping connections from the feed source and for the final discharge lines, together with power supply in order to have it ready for operation.

The equipment components provided in the assembly are of such character and capacity as to provide a complete and efficient treatment of substantial capacity in a treatment space of relatively small dimension. This involves the provision of novel equipment, including a combined agitator and tray thickener assembly incorporated in a single tank and a novel final clarification unit which also provides a classifying function and conducts the clarified liquid of such treatment to a final filter stage for final removal of contained solids so that the liquid of filtrate discharge of such filtration stage is adequately conditioned and clarified for return to natural waterways or other domestic waters.

The novel structural and functional features of the equipment components will be described next followed by a description of typical practices performed with the equipment as depicted in flow sheet representations of the accompanying drawings. Again referring to FIG. 1, a number of the structural features of the equipment not included in the earlier description will now be set forth in detail. In this connection, it should be observed that the combined agitator and thickener units 12 and 22 shown in FIG. 1 preferably are structural duplicates and were given different reference numerals solely because of their different location in the circuiting arrangement. In FIG. 2, the plan view of tank unit 12 is a view from above the top of said tank, whereas the plan view of unit 22 is as though viewed from a lower position immediately above the tray thickener installation in the lower portion of said tank. Certain of the structural features shown in the plan view of tank 22 were obscured by other structure shown in the plan view of tank 12 and it will be understood that all such structure actually is present in both tanks.

The details of the parts arrangements and functioning of said tanks will now be set forth. As shown in FIG. 1, first treatment tank 15 has superstructure 29 at its top for support of the motor 30, transmission 31 and bearing assembly including drive sheave 32 of an agitator unit designated generally 33. The shaft 34 of this unit preferably is hollow to provide one or a plurality of passages for introduction of air, other aerating gas, liquid or reagents into an upper agitator 35 or a lower agitator 36. The upper agitator is disposed within the enclosure of a conical baffle 37 which imparts an upward direction to the material acted on by said upper impeller 35. Another baffle 38 encloses the lower impeller 36 and directs the material agitated thereby in a downward direction through the lower part of agitator portion 14. This baffle 38 may be extended further in a downward direction to induce more of a sweeping action in the circulatory flow.

Material elevated by upper agitator 35 and its associated baffle 37 which contains fine solids and colloids reaches the surface and a portion of the agitated surface flow is drawn into a depending distributor chamber 40 by overflowing its upper open end 40a. The remaining surface flow is agitated sufficiently to keep solids in suspension. The lower end of chamber 40 narrows and terminates in a restricted opening 40x which connects with a passage or tube 41, and the flow through opening 40x is controlled by a conical plug 42 connected to and actuated by a hand wheel 43 to vary the effective size of opening 40x.

As previously noted, the upper agitation zone 14 and the lower tray thickener portion 17 of tank 12 are in superposed relation and separated by a partition member 44 which also provides support for the drive means 45 and shaft 46 carrying the scraper mechanism 47 and 47a of the upper and lower tray thickners 48 and 49, respectively. A centrally disposed feed well unit 50 of novel character also is supported in a depending position from partition member 44, the details of which will be described with reference to FIG. 4.

Figure 4:
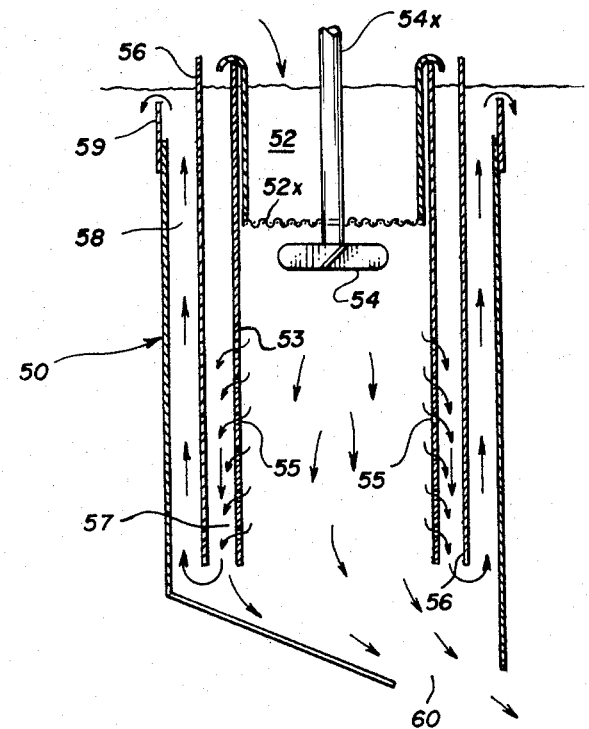
FIG. 4 is an enlarged cross sectional view of the regulator assembly delivering feed to the thickener units shown in FIGS. 1 and 2.

As shown in FIG. 4, a screen compartment 52 is centrally disposed in an agitating chamber 53 with a rotary agitator 54 disposed below and in proximity to the lower screen surface 52x of the compartment 52, which compartment is arranged for manual withdrawal from its seated position on the top surface of chamber 53 for screen cleaning or replacement. The discharge of passage 41 comprises the feed introduced into compartment 52 and agitator 54 is operated at a speed which will cause low intensity vibration of screen 52x to separate fines and colloidal matter from associated heavier sands present in the feed to compartment 52. Sands collected in compartment 52 which do no pass screen 52x and are too heavy to be elevated by the agitator action are collected and periodically removed by manually raising the screen portion 52x out of the tank and dumping the collected sands or oversize as waste.

The lower wall portion of agitating chamber 53 has a series of apertures 55 disposed in circumferential rows at intervals throughout the lower portion. A tubular baffle member 56 is disposed between chamber 53 and the outer wall of feed well 50 and divides the space into an inner passage 57 and an outer passage 58. The upper end of baffle 56 extends above the normal fluid level and the action of impeller 54 imparting a downward flow to material below the screen compartment 52 causes a substantial portion of such flow to pass through the openings 55 and create a downward flow in inner passage 57 in which air can be entrained by the suction effect of the pumping action. Consequently, the solids passing in such downward flow are again aerated and the lighter components move outwardly from such flow at the bottom of baffle 56 to enter passage 58 and assume an ascending movement therein.

The heavier solids and a considerable amount of the associated liquid continue the descending movement initiated in chamber 53 and extending into passage 57 to eventually reach a restricted outlet opening 60 at the bottom of the feed wall member 50. The ascending flow through passage 58 passes over an adjustable weir member 59 and the adjustment may be utilized to effect a size separation at the bottom of passage 57 between the solids continuing descent to restricted outlet 60 and the fine sizes and colloidal material which rises to pass across the overflow 59.

The material discharged through outlet 60 has a displacement effect on the quiescent liquid in the lower tray thickener 49 and the heavier solids descending therein settle out of suspension and are acted on by the scraper mechanism 47a which crowds the settled matter into a conical discharge zone. The upper tray thickener has a relatively narrow deck or bottom portion 63 and the scraper mechanism 47 in overhanging relation thereto moves settled solids to the lower end of such narrow deck 63 where they are free to settle into the lower tray thickener 49. Any lighter solids put into suspension in the upper thickener 48 by the action of such raking mechanism travel along the surface under a flow induced in part by the overflow action of feed well 50 and ultimately are collected in a chordal launder 64 at the top of tray thickener unit 48. This launder discharges to pump 21 delivering feed into the second treatment tank 22.

From the foregoing, it will be apparent that the entering feed delivered to the agitation stage of the first treatment tank 15 fills the agitation stage to a level established by the overflow intake 40a of chamber 40 and the setting of the plug 42 by the hand wheel 43. The rate of discharge through the bottom opening 40x of chamber 40 is related to the feed delivery rate to establish the desired head over the top of chamber 40 and to provide a desired retention interval in chamber 14. Reagent is introduced through the feed inlet 16 and air, liquid or reagents are delivered through the hollow shaft 34 of the agitator assembly so that the material circulated upwardly by the upper agitator 35 and its associated conical baffle 37 establishes a vortex effect within the baffle enclosure and a surface circulation at the top of the pulp body in chamber 14.

At the same time, the lower impeller 36 directs pulp downwardly within the confines of its associated baffle member 38 to induce a strong circulaion toward the bottom of stage 14 and outwardly toward the periphery thereof. It will be noted that both of the baffle members 37 and 38 have narrow central openings which permit a recirculation of material with the elevating blade position of impeller 35 drawing a portion of the circulatory flow into the lower entrance opening of baffle 37 and the downwardly directing position of the blades of lower impeller 36 inducing a similar intake action through its upper narrow opening. In this way, substantial quantities of the reagent introduced through feed inlet 16 are mixed with the air or other aerating gas or liquids delivered through shaft 34 and released within each of the impeller enclosures so that the confined material in stage 14 receives aeration and contact with reagent before the discharge portion of same overflows the intake of chamber 40 for ultimate introduction into the lower thickener stage 17.

The feed to thickener stage 17 through passage 41 enters the screen compartment 52 where it is subjected to a gentle vibratory action initiated by the rotary agitator 54, the blades of which are positioned to direct a downward flow through the agitation chamber 53 in the upper end of which screen compartment 52 is disposed. In this arrangement, the shaft 54x preferably is hollow and supplies air which is discharged through suitable openings in its impeller portion and the combined agitation action and aeration produce a vibratory effect of low intensity on the lower screen surface 52x of compartment 52. The downward thrust imparted by the impeller agitator 54 causes a descending flow of liquid passing the screen surface and any fines or colloidal matter are carried in such flow in a descending movement directed toward the restricted bottom outlet 60 of feed well 50. As the upper limit of screen compartment 52 is above the surface or liquid level established in compartment 17 by the adjustment of the overflow member 59, the intake end of compartment 52 is above such level and other air or gas may be drawn into the descending flow from passage 41 by the cascading effect of the discharge from such passage. In this way, extreme fines and colloidal matter are separated from the coarser solids passing screening surface 52 x and escape through the openings 55 and the separation of flows at the bottom of passage 57 rise in passage 58 and discharge across overflow member 59.

The partially clarified liquid containing colloidal matter and extreme fines passes into the chordal launder 64 and subsequently discharges from the first thickener stage 17 as feed to the pump 21 supplying the feed to the second combined agitator thickener unit 22. As the structural features of units 12 and 22 have already been described as being identical, the parts numbering in unit 22 is the same as the parts numbering in unit 12 with the exception of the features of the thickener underflow discharge which have been given separate reference numerals to indicate the succession of flow as illustrated in FIGS. 1 and 2. Therefore, it will be understood that the treatment procedure in unit 22 is essentially the same as in unit 12.

Regarding the underflow discharge, the valve 19 in the line 18 is intended for discharging collected solids which have entered line 18 and also for draining thickener portion 17 when necessary, as in service and repair operations, for example. Otherwise, the underflow of the lower tray thickener unit 49 passes through the discharge outlet 18x and also comprises a substantial part of the feed to pump 21. Similarly, with respect to the discharge from the second combined unit 22, the overflow discharge will be into chordal launder 64 and thence to pump 24 and the underflow discharge will be through discharge outlet 23x and thence to pump 24. Pump 24 supplies the feed to a classifying superclarifier of the general type disclosed and claimed in Daman Patent No. 3,186,700 of June 1, 1965. The interior of clarifier tank 25 has a series of decks 65 at intervals throughout the vertical extent of the tank. The decks have spaced apertures 65a and have their peripheries in spaced relation to the side walls of tank 25. Each of the decks other than the lowermost deck 65x has a central opening 65b and the surface exteriorly of said opening apertured throughout its circumferential extent as shown at 65a so as to permit descent of liquid from deck to deck. The lower deck 65 has an imperforate surface disposed with an elevated rim at the central opening and the surface inclines downwardly from said central opening to the exterior wall of tank 25 with an outlet 61 feeding from said deck to pump 26 which delivers the aerated and reagentized liquid to the final filter stage 27.

A hollow shaft member 67 extends downwardly throughout most of the vertical extent of tank 25 from a support and driven position on superstructure at the top of tank 25. The shaft carries baffles or deflectors 67a overhanging the central openings 65b which cause the circulating gas flow to divide with portions of same traveling through the apetures 65a of the decks and other portions circulating around the deflectors and entering the central openings 65b. Shaft 67 also carries arm members 67m in superposed relation to each of the decks 65. Each arm has a series of contact surfaces which may be squeegee material or metallic brush for contact with the decks 65 when the shaft is lowered to provide such contact. After a given period of scouring or cleansing, particularly to remove solids closing apertures 65a of the respective decks, the shaft is again elevated by suitable adjustment mechanism on the superstructure to move the contact surfaces away from the decks 65. Air or other gases or liquids may be delivered into hollow shaft 67 and discharged at intervals throughout its length. Such fluid introduction usually is employed for final reaction with the solution or contained solids under treatment before delivery from the clarifier stage 25 as feed to the final filtration stage 27. As an example, chlorine may be introduced into the treatment at different levels, either in its gaseous form or as an aqueous solution.

In addition, the main gas supply to clarifier 25 is delivered into its lower portion by a suitable heater or blower 69 as shown in FIG. 2. The hot gases so introduced flow upwardly through the central openings and also under the apertured surfaces of the respective decks 65 to contact the descending liquid flow throughout the vertical extent of clarifier 25. The spent gases are exhausted through a suitable top vent (not shown).

Filtration stage 27 may utilize any suitable type of filtration equipment, here shown as the well-known bag filter 70 of Denver Equipment Company. A header 71 acts as a feed distributor to divide the incoming feed from pump 26 and introduced it into each of the several bag units 70. After passage through the filter unit 70, the clarifying liquid discharges from an outlet 72 for return to a stream or other domestic water source. The solids retained in the bags are removed periodically and disposed of as a waste material unless they contain constituents of sufficient value to justify recovery procedure as will be described with reference to the accompanying flow sheet drawing FIG. 6.

Figure 5:
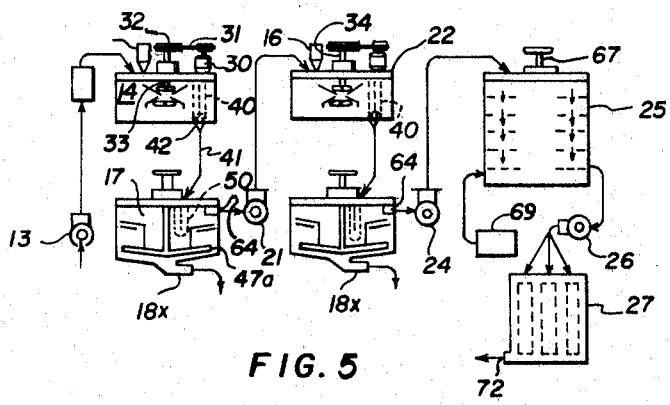
FIG. 5 is a flow sheet representation of a typical circuiting arrangement for treatment to provide a clarified liquid as a final product of the treatment.

A typical flow sheet for the practice of the present invention has been shown in FIG. 5 which is intended to represent a treatment where the separated solids are passed to waste and clarified liquid is the actual product of the treatment requiring return to a natural water supply or other domestic water source. The separate stages of the combined agitator-tray thickener units are shown in separated relation as each stage represents a separate treatment, but it will be understood that the flow sheet actually depicts circuiting as in a combined unit of the type illustrated in FIGS. 1 and 2.

As the equipment shown in the FIG. 5 flow sheet is intended to be the same as in FIGS. 1 and 2, the same reference numerals have been applied. Therefore, in such circuit a waste liquid from a source of supply (not shown) is delivered by the pump unit 13, preferably the well known Denver SRL pump, and is elevated to a central discharge position at the top of the agitator stage 14. Reagent also is introduced into the top of the agitator stage through a feeding device 16 and the pulp level in said stage is controlled and regulated by a distributor chamber 40 and associated plug or valve 42. An agitator unit 33 comprising upper and lower impellers is disposed in stage 14 and driven by a motor 30, drive sheave 32 and transmission 31 to induce a substantial circulation of the pulp in stage 14, together with a mixing of reagent and aerating gas so that the required purification reactions are produced while the circulating waste liquid is retained in stage 14.

The portion of the treated pulp in stage 14 which overflows distributor chamber 40 and passes plug 42 is delivered through a passage 41 into a feed well unit 50 in the lower tray thickener stage 17. The thickener underflow passing through a discharge portion 18x may be passed to waste if substantially dewatered or otherwise will be delivered to a pump 21 together with the overflow from a launder 64 to constitute the feed to the second combined agitator-tray thickener unit represented generally by the reference numeral 22. The underflow material also may be discharged through the outlet 18x of this second stage or when necessary is combined with the feed from launder 64 delivered to pump 24 to supply the classifying and clarifying unit 25, the action of which has been previously described. The clarified liquid from unit 25 is conducted by a pump 26 to a filtration stage 27 with the final filtrate discharging therefrom at 72 comprising a liquid sufficiently clarified and purified to permit its return to a natural water course or delivery into a domestic water supply. A blower 69 delivers heated air into the interior of clarified stage 25 and together with reagent fed through hollow shaft 67 provides the final reaction with the liquid content in said stage so that the liquid delivered to pump 26 only requires separation from associated solids and colloidal matter as the final treatment procedure before discharge.

In performing such a purifying and clarifying treatment of waste liquids by a circuiting arrangement of the type shown in FIG. 5, the reactions required in the purification of the liquid will be produced by well known and presently accepted methods for purification of this type. The equipment arrangement provides a desired amount of aeration and liquid-reagent contact at each treatment stage so that the purification procedures are performed efficiently.

Figure 6:
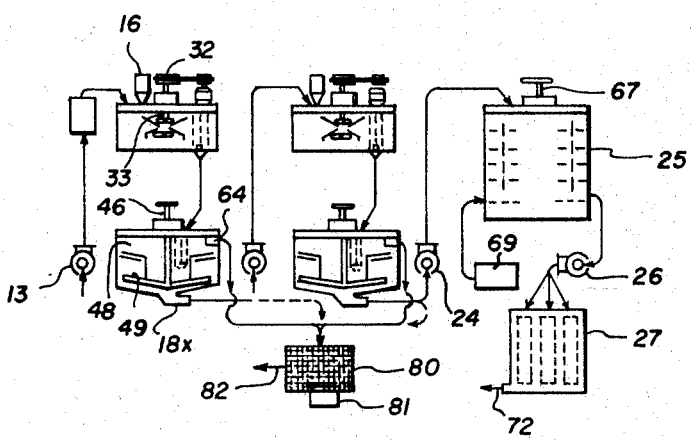
FIG. 6 is another flow sheet circuit utilizing the assembly shown in FIG. 1 where the thickener underflow is collected to provide a valuable product of the treatment.

The treatment performed in the FIG. 6 flow sheet is essentially the same as that performed in the circuit of FIG. 5 except that the solids content introduced into the treatment comprises or contains a valuable constituent which is to be recovered as a final product of a treatment. As the equipment stages shown in FIG. 6 are essentially the same as in FIG. 5, the same reference numerals have been applied. One additional stage is provided in the circuiting arrangement of FIG. 6, namely, passing the underflow discharge from the outlets 18x of the respective tray thickener stages into a filter 80, preferably a pan filter such as the well-known Denver Pan Filter for final moisture removal so that the cake comprising the final solids product of the separation will be in condition to be treated by any well known methods for recovery of the valuable constituent. In many instances, it will be preferable to ship the dewatered solids as a concentrate material to a remote treatment location, such as a smelter or the like, and the filtrate discharged by vacuum pump 81, for example, may be delivered to pump 13 if substantial purification is required, or otherwise may be delivered to pump 24 as feed to the clarifying stage 25 and subsequent passage through the filter stage 27. The final filter discharge is shown in FIG. 6 at 82 and the final liquid discharge from filtration stage 27 is indicated at 72 as in the flow sheet FIG. 5.

The structural arrangement illustrated in FIGS. 1 through 4 is intended as a complete plant installation well suited for use in industrial treatment of sewage or industrial waste liquids utilizing procedures either of the type exemplified in the flow sheets FIG. 5 or FIG. 6. Such a complete assembly may utilize apparatus components of variable sizes and capacities and the proportioning of the apparatus depicted in FIGS. 1 and 2, for example, is intended merely as illustrative.

In addition to its use as a continuing operating unit, an assembly of the types shown in FIGS. 1 and 2 may be utilized as a pilot plant operation to determine the most efficient treatment for a similar operating circuit of larger capacity. Consequently, as shown in FIG. 1, provision is made for the feed delivered by pump unit 13 to be distributed so that only a portion of same enters agitator-tray thickener tank 12 and another portion is passed as feed to the clarifier unit 25. It also is intended that other changes in the number of stages may be utilized as by increasing or decreasing the number of combined agitator thickener units or superclarifiers. In addition, any suitable type of filtration equipment may be provided at filtration stage 27 and the bag filters shown and described are merely a convenient type of filtration equipment for such units.

Similarly, with respect to the pumps shown at 13, 21, 24 and 26 in FIG. 1, such pumps have been referred to in the preceding description as being suction pressure pumps of which the Denver diaphragm pumps are representative. The provision of such pumps in the circuit permits a selective elevated discharge position to be utilized.

I claim:

1. A portable plant for clarification of liquids of sewage or industrial wastes which comprises a wheel-supported base structure adapted for movement from one working location to another and having flat undersurface portions adapted to seat on a foundation structure at a working location, equipment comprising a plurality of treatment stages secured on said base structure for transport by or operation thereon, said equipment providing a complete single-pass circuit for such clarification treatment and including a first combined agitator-tray thickener tank, means including a pump for delivering such a waste material from a supply source into the agitator stage of said first tank, means for delivering reagent and aerating gas into said agitator stage, pulp circulating means for delivering treated pulp from said agitator stage into the tray thickener portion of said first tank, means for the selective discharge of at least some of the thickener underflow from the first tank, means including a pump for circulating the thickener overflow and at least some of its underflow to a second combined agitator-tray thickener tank similar to said first tank, means including a pump for circulating the second thickener overflow and some of its underflow to a classifying and clarifying tank, means for subjecting the feed to the latter tank to aeration, means including a pump for delivering aerated fluids of the classifying and clarifying tank to a filtration stage, and filter means for separating a clarified liquid from associated solids at said filtration stage.

2. A portable plant as defined in claim 1, in which valve controlled means selectively discharge some of the thickener underflow from the treatment.

3. A portable plant as defined in claim 1, in which the means for delivering reagent and aerating gas to the agitator stages will selectively vary the amount of each.

4. A portable plant for clarification of liquids of sewage or industrial wastes which comprises a wheel-supported base structure adapted for movement from one working location to another and having flat undersurface portions adapted to seat on a foundation structure at a working location, equipment comprising a plurality of treatment stages secured on said base structure for transport by or operation thereon, said equipment providing a complete single-pass circuit for such clarification treatment and including a first combined agitator-tary thickener tank, means including a pump for delivering such a waste material from a supply source into the agitator stage of said first tank, means for delivering reagent and aerating gas into said agitator stage, pulp circulating means for delivering treated pulp from said agitator stage into the tray thickener potrion of said first tank, means for the selective discharge of at least some of the thickener underflow from the first tank, means including a pump for circulating the thickener overflow and at least some of its underflow to a classifying and clarifying tank, means for subjecting the feed to the latter tank to aeration, means including a pump for delivering aerated fluids of the classifying and clarifying tank to a filtration stage, and filter means for separating a clarified liquid from associated solids at said filtration stage.

5. A portable plant as defined in claim 4, including means for introducing reagent into the classifying and clarifying tank.

6. Apparatus for separating solids in liquids comprising an upright tank, partitioning means dividing the tank interior into an upper agitation stage and a lower thickening stage, means in the agitation stage for subjecting incoming feed to an elevating movement in the upper portion of said stage and to a downward movement in a lower portion of said stage, an elongated chamber in an upper portion of the agitation stage having an overflow intake at its upper end and a restricted passage at its lower end, a feed distributor extending into the thickener stage from the agitation stage, valve means for regulting flow through the restricted passage of the elongated chamber and into said feed distributor, upper and lower tray thickeners in said thickener stage arranged to receive feed discharged by said distributor, means in an upper portion of the thickener stage for collecting and discharging clarified fluid as an overflow product of the separation, and means for discharging a thickened underflow product from a lower portion of said thickener stage.

7. Apparatus as defined in claim 6, in which the means for directing incoming feed in elevating and downward movement at different elevations in the agitation stage comprises a pair of impellers mounted on a common shaft and a baffle member associated with each said impeller.

8. Apparatus as defined in claim 7, in which the common shaft is hollow and delivers aerating gas to the impellers.

9. Apparatus as defined in claim 6, in which passages are provided to permit ascending flow from the lower to the upper tray thickener unit adjacent the periphery of said units.

10. In apparatus for treating sewage or industrial waste liquids, inclusive of a combined agitator-tray thickener assembly within a tank having a plurality of tray thickeners in its lower portion and an agitator portion in superposed and flow-separated relation to said lower portion, a feed distributor supported in a depending position centrally of said lower portion and comprising a hollow body open at its top and having a narrowing bottom portion defining a restricted discharge outlet, an adjustable weir member at the top of said body for varying its overflow level, inner and outer tubular partitions dipsosed in upright spaced relation interiorly of said body having their lower ends spaced from the restricted discharge outlet, the inner partition forming an internal treatment passage for directing pulp flow, a screening member in the upper portion of said passage having a lower screening surface, a rotary agitator below the screening surface in said passage and in proximity thereto for imparting low intensity vibration to said screening surface and directing material passing the screen downwardly through said passage, said inner and outer partitions having their top surfaces above the liquid level in said lower portion established by the adjustable weir setting, and a lower portion of said inner partition being circumferentially apertured for discharge of pulp from said passage into a passage defined by said inner and outer partitions, the descending movement in said passages having a displacement effect on material passing below the passage defined by the inner and outer partitions thereby causing an elevating flow to pass between the outer partition and the body for discharge across the weir.

11. Apparatus for treating solids in liquids comprising a tank of substantial vertical extent having a series of perforated deck members disposed in spaced vertical relation, each having apertures distributed over the deck surface for descent of liquid from one said deck to a lower deck, means at the bottom of said tank for collecting and discharging the descending liquid therein, means for introducing gas into the lower portion of the tank for flow through and around said deck members countercurrent to the descending liquid, means inclusive of a shaft for moving wiping surfaces over the top portions of said decks, and means for raising and lowering the shaft so as to move said wiping surfaces in and out of contact with said decks.

(References on following page)

References Cited

UNITED STATES PATENTS

| | | | |
|---|---|---|---|
| 922,025 | 5/1909 | Newman | 210—219 X |
| 1,271,925 | 7/1918 | Moore | 210—195 X |
| 2,382,490 | 8/1945 | Lawlor | 210—208 X |
| 2,393,976 | 2/1946 | Daman et al. | 210—208 X |
| 2,889,929 | 6/1959 | Kivell | 210—261 X |
| 3,186,700 | 6/1965 | Daman | 23—282 X |

REUBEN FRIEDMAN, *Primary Examiner.*

J. L. DE CESARE, *Assistant Examiner.*

U.S. Cl. X.R.

210—203, 219, 519, 531